United States Patent [19]
Jordan et al.

[11] 3,834,127
[45] Sept. 10, 1974

[54] APPARATUS FOR THE SCRUBBING OF GASES

[75] Inventors: Wenzel Von Jordan, Wixhausen; Albert Kleinhenz, Oberhochstadt; Jean Wiemer, Mainz; Horst Hemmerling, Frankfurt am Main, all of Germany

[73] Assignee: Metallgesellschaft Aktiengesellschaft, Frankfurt am Main, Germany

[22] Filed: May 11, 1973

[21] Appl. No.: 359,531

[30] Foreign Application Priority Data
May 19, 1972  Germany.............................. 2224519

[52] U.S. Cl....................... 55/226, 55/230, 55/257, 261/62, 261/DIG. 54
[51] Int. Cl............................................ B01d 47/06
[58] Field of Search ............ 55/220, 223, 225, 226, 55/230, 240, 257, 410, 417; 261/62, DIG. 54, DIG. 56

[56] References Cited
UNITED STATES PATENTS

| | | | |
|---|---|---|---|
| 912,167 | 2/1909 | Potter | 55/230 X |
| 1,637,597 | 8/1927 | Ulrici | 261/DIG. 54 |
| 3,113,168 | 12/1963 | Kinney | 261/117 X |
| 3,199,267 | 8/1965 | Hausberg | 55/257 X |
| 3,343,341 | 9/1967 | Wiemer | 55/226 X |
| 3,378,240 | 4/1968 | Kinney | 261/DIG. 54 |
| 3,406,499 | 10/1968 | Wiemer | 55/230 |
| 3,502,308 | 3/1970 | Simizu | 261/DIG. 54 |
| 3,544,086 | 12/1970 | Willett | 261/62 |
| 3,631,656 | 1/1972 | Huasberg | 55/257 |
| 3,791,108 | 2/1974 | Hausberg et al. | 55/226 |

Primary Examiner—Frank W. Lutter
Assistant Examiner—V. Gifford
Attorney, Agent, or Firm—Karl F. Ross; Herbert Dubno

[57] ABSTRACT

A single-stage or plural-stage scrubber having a cylindrical or polyhedral housing is provided with a bottom partitioning the housing into upper and lower portions and provided with an outlet of a cross-section less than that of the partitioned housing through which the gas emerges. Below this bottom is provided an upward open tub and a ring is provided between the outlet and the tube to define a laterally open clearance which is adjustable by vertical displacement of the ring. Preferably two such rings are used in telescoping relationship and one of the rings is vertically displaceable, the ring defining a variable lateral cross-section designed for linear pressure characteristics with axial displacement of one of the rings.

9 Claims, 9 Drawing Figures

APPARATUS FOR THE SCRUBBING OF GASES

FIELD OF THE INVENTION

The present invention relates to liquid-gas contacting systems and especially to gas washers or scrubbers of the single-stage or plural-stage type in which an intimate contact is brought about between a gas, e.g. a furnace waste gas, and a scrubbing liquid to transfer a component entrained by the gas to the liquid phase. More particularly, the invention relates to improvements in scrubbers in which the intimate contact between liquid and the gaseous phase is carried out by spraying the liquid into the gas as the latter traverses a constricted passage.

BACKGROUND OF THE INVENTION

In the art of liquid/gas contacting, especially for the scrubbing of a furnace gas with a liquid, it is known to bring about intimate contact of water droplets with a gas by passing the latter through a constriction formed in a partition of a cylindrical or polygonal housing, the partition subdividing the upright housing into an upper and a lower chamber. The partition, generally referred to in the art and hereinafter as a "bottom," thus has an opening of a flow cross-section which is smaller than that of the housing itself.

It has been proposed to provide an upwardly open tub in axial alignment with and below this bottom and to define between the tub and the outlet a lateral annular slot or gap through which the liquid/gas mixture is forced to bring about effective interaction between the liquid and gaseous phases. The tub thus has the function of laterally deflecting the gas through the annular gap between the tub and the outlet. The outlet of the bottom, in effect, may be an inlet for the next stage and preferably is defined by a tubular member which reaches axially toward the tub so that the slot is defined by the upper edge of the cylindrical tub and the lower portion of the cylindrical inlet duct.

In the design of such devices, especially when they are to be used for the removal of water-soluble or water-insoluble gaseous or solid contaminants of an exhaust gas stream to be discharged in the atmosphere, care must be taken to provide effective removal of the contaminants so that the emerging gases comply with environmental needs and legally established restrictions on the discharge of pollutents to the atmosphere. Thus every improvement in the effectiveness of such devices is of considerable significance.

In the prior art arrangements described above, it has been found that efficiency is critically related to the size and configuration of the annular lateral gap or slot defined between the upper portion of the tub and the lower portion of the inlet duct depending from the overlying bottom. The inlet duct or opening of the latter is usually disposed centrally, i.e. along the axis of the apparatus, and control of the lateral gap is brought about by axially displacing the tub in accordance with the operating requirements. These systems have, however, the disadvantage that the full gas-pressure differential across the outlet gap acts upon the tub which may have a large effective cross-section in addition to considerable weight of its own and of collected water therein. The mechanism for raising and lowering the tub, must, therefore, overcome this considerable loading and, where a motor is used, the dimensions of the motor must be correspondingly large.

For example, where the tub has a diameter of about 2 meters and the pressure differential across the gap is about 1.5 kg/cm$^2$, a level which is not unusual, the force applied by the gas pressure to the tub will amount to about 60 metric tons and must be overcome by the motor. The gap tolerance may be between 0.5 and 1.5 mm although it has been observed that, with small gas flow rates, variations within these tolerances will have a significant effect upon the pressure differential across the gap and may interfere with attempts to maintain a constant pressure differential as is necessary to insure a constant degree of purification.

In order to maintain the constant level of gas purification and thus a constant pressure drop across the gap, automatic control means may be provided to operate the motor for axial displacement of the tub in the manner indicated. Since the mass of the tub is so large, however, and the tolerances which are acceptable are so small, the inertia of the tub precludes effective adjustment of the gap without hunting, regardless of the size of the motor and necessitates complex control equipment. It is self-evident that massive motors utilize considerable energy and have high capitalization costs.

The problem is even more pronounced when the system is to be subjected to gases, e.g. as arise from a pressurized blast furnace, with pressure and volume which vary sporadically and spontaneously within wide ranges and hence rapid response of the control equipment is desired. In practice, with conventional tub-elevation systems, a constant pressure differential cannot be effectively maintained in the face Of fluctuation in the pressure of the incoming gas or its flow rate.

OBJECT OF THE INVENTION

The principal object of the present invention is to provide an improved gas-liquid contactor of the general type described above wherein the aforementioned disadvantages are obviated.

Another object of the invention is to provide a gas scrubber capable of operating at high efficiency to remove contaminants from a gas stream subject to rapid and significant gas-pressure fluctuations.

It is another object of the invention to provide a compact wet-treating apparatus capable of purifying gases at a high rate such that the discharged gases comply with legal requirements limiting pollution of the atmosphere and also capable of increasing the purity of the discharged gases so that they may be used effectively in other processes without additional or expensive treatment stages.

Still another object of the invention is to provide a gas scrubber with improved facility of control of the gas-flow gap.

It is still another object of the invention to provide a low-cost, high-efficiency gas scrubber of the annular-gas contactor type in which the control apparatus can be of smaller size and it is simpler and more convenient to maintain a constant pressure differential across the gap.

SUMMARY OF THE INVENTION

These objects and others which will become apparent hereinafter are attained, in accordance with the present invention by providing an upright housing of circular or polygonal cross-section which is vertically subdivided by a generally horizontal partition or bottom provided with a central opening forming an inlet, an upwardly open tub axially aligned with the inlet but based therebelow to define an annular lateral gap traversed by the gas/liquid mixture, means for feeding a gas, e.g. furnace exhaust gas, axially through said inlet toward the mouth of said tub, means for spraying liquid into the gas traversing the inlet and deflected outwardly through the gap by said tub, and at least one vertically displaceable annular member disposed in the region of the gap and forming an adjusting ring which can be raised and lowered to vary the configuration of the gas (e.g. its shape or width) and thereby adjusting the character of the gap to regulate the pressure differential thereacross.

An essential feature of the invention thus resides in the disposition of an annular member at the gap to serve as an adjusting ring which can be raised and lowered without axial displacement of the fixedly positioned tub and independently of the position of the latter so that the mass of the tub no longer need be sustained by the control means. The annular member can be vertically adjusted virtually without any effort. For example, if the tub has a diameter of 2m as described previously, the differential pressure is about 1.5kg/cm², and the system is otherwise similar to that previously described, the motor must be capable of moving 60 metric tons, whereas a ring performing the idential function may be displaced by a motor capable of shifting 1 to 3 metric tons. The annular member may be formed as a single unitary or monolithic body or may be composed of a plurality of interfitting or articulated segments which may be individually or collectively replaced as they wear with use.

According to a more specific feature of the invention, the central opening is provided with an annular cylindrical duct member coaxially received in the opening and projecting axially toward the tub while a second cylindrical member is coaxially received within the tub and is substantially telescopingly interfittable with the inlet member, at least one of the annular members being axially displaceable in the manner previously stated.

We have discovered, most surprisingly, that the scrubber of the present invention may be used effectively without diffusor chambers downstream of the annular gap when the scrubber is connected to a high-pressure blast furnace. In this case, the full pressure differential between the outlet pressure at the blast furnace and the low pressure in the purified-gas line to which the scrubber is connected drops within the scrubber.

According to still another feature of the invention, the edge of one of the aforementioned annular members is provided with crenellations turned toward the other member and designed to vary the lateral gap configuration and size with movement of the axially displaceable member (which may be the same as or different from the crenellated member) so as to maintain an approximate linear relationship between the vertical position of the displaceable member and the pressure drop across the gap. In general, the crenellations may be considered as curved recesses and do not influence the degree of separation.

When the curved recesses and particularly the free areas formed thereby are properly selected, however, they will have a significant effect on the relationship between the elevation of the displaceable member and the exposed gap area and thus upon the pressure throughout the operating pressure range and particularly with small gas flow rates even in the event of large tolerances in vertical movement. If the outlet areas of the gap which are exposed or covered as a result or an increment of movement of the adjusting ring are properly selected, the hyperbolic relationship between the pressure and the gap width can be approximately linearized so that small gas flow rates can be controlled in a simple manner.

According to another feature of the invention, the adjustable ring disposed in the stationary tub has a configuration similar to that of a curved wheel, i.e. a felly defining the annular gap, a hub mounted upon a spindle or rod, and spokes connecting the felly with the hub, the hub being removable seated on the rod so that the ring can be radially changed for replacement of the curved surfaces defining the annular gap as mentioned previously. This exchange or replacement may be necessary with wear of the ring or when a different response characteristic is desired. It has been found to be desirable to provide relatively large rings of circular or polygonal configuration, forming a plurality of individually replaceable segments. The stationary annular member can likewise be polygonal or circular in section and composed of a single piece or a plurality of segments.

According to another feature of the invention, a cylindrical or conical tube is provided around the central opening of the partition or bottom so as to define, between the housing wall and this upstanding tube a liquid collecting chamber. The annular liquid collecting chamber thus provided has been found to be especially advantageous when the housing is formed with a plurality of such partitions or bottoms in axially spaced relation, the intermediate bottoms being formed with such collecting chambers. Means is provided for draining the liquid from the collecting chamber after it has separated from a preceding first stage.

A hood is advantageously provided at the rim of the tub and an annular space is formed by and between the lower portion of the hood and the container wall. The scrubbing liquid which flows radially out of the outlet gap is guided close to the wall of the housing by this upwardly convex, downwardly concave hood, so that the liquid can pass from the hood without interference with gas movement.

According to another feature of the invention, baffles are provided in the annular space for separation of drops from the gas and the angularly-spaced baffles or drop-separating plates which may be scoopshaped or inclined to the vertical, cause the gas to shed the liquid and the liquid to run down along the wall in the form of a liquid film in accordance with the principles of impingement or deflection (inertia) gas liquid separators. The liquid is introduced by a generally conical nozzle member disposed in the central opening of the bottom or partition or in axial alignment therewith slightly above the central opening. The nozzles are preferably so arranged that, in the case of a hollow-cone nozzle, the outlet gap is fully embraced within the annular spray cone discharged between the nozzle. In a solid-spray system, the tub is also filled with scrubbing liquid and there is obtained an overflow effect resulting from passage of the liquid outwardly over the edge of the tub behind the outlet gas.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
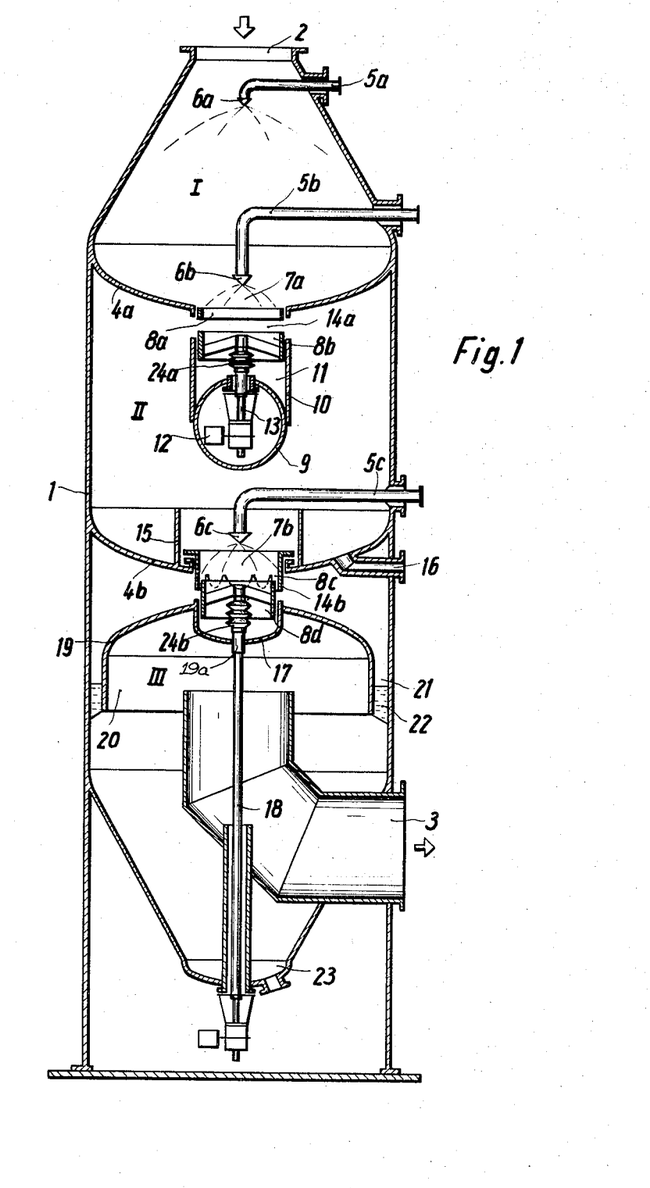
FIG. 1 is a vertical cross-sectional view partly in diagrammatic form, of a scrubber according to the invention.

In FIG. 1 we show a multistage scrubber, according to the invention, comprising an upright cylindrical housing 1 formed with an inlet 2 at its upper end, the circular inlet being connected to the cylindrical housing 1 by downwardly diverging frustoconical housing portion. At the lower end of tHe housing, a lateral outlet duct 3 is provided which has a horizontal stretch in the region at which it emerges from the housing 1, a vertical stretch open axially upwardly above the floor of housing 1, and a transition stretch through which the gas traversing the duct 3 is deflected through 90° to emerge laterally from the housing. Depending upon the local connection arrangements, the inlet and outlet may extend vertically or laterally without affecting the operation of the system.

The housing 1 is internally subdivided by two intermediate partitions or bottoms 4a and 4b into an upper chamber or stage I, an intermediate chamber or stage II and a lower chamber of stage III, the stages being interconnected by central circular openings in the bottoms 4a and 4b.

The upper zone I serves for the cooling and humidification of the gas and saturates the latter with moisture, a nozzle 6a connected to an inlet duct 5a, being provided to spray the liquid into the descending air in this zone. More vigorous saturation of the gas is achieved by dispensing liquid in a hollow or solid cone from a nozzle 6b disposed immediately above and in axial alignment with a circular opening 7a formed in the upper bottom 4a. Nozzle 6b is supplied with liquid from a bent duct 5b. A detachable annular member 8a or ring is disposed in the central opening 7a and can be removably carried by the bottom 4a.

A laterally extending duct 9 passes through the wall of the housing 1 and carries, at its free end terminating within the housing, a tubular upwardly open duct 10 which lies at right angles to duct 9, is axially aligned with the opening 7a and the ring 8a, and forms a tub which has generally been indicated at 11.

A rod 13 extends centrally into the tub 11 through the duct 9 and is axially shifted by a motor 12 or some hydraulic, pneumatic or mechanical drive arrangement. It has been found that the adjustment mechanism can be particularly simple if the rod 13 is externally threaded but prevented from rotating, the motor 12 carries a worm, and a worm wheel meshes with the worm and is formed with a nut which is threaded onto the rod and is axially fixed so that, with rotation of the worm wheel, the rod is raised or lowered.

An angular member 8b which is similar to a carriage wheel has its hub removably mounted upon the rod 13, the hub being connected by spokes to the cylindrical felly which forms a vertically adjustable annular member in axial alignment with the annular member 8a.

The annular member 8a and 8b define an outlet gap 14a through which gas and water flow radially into the second zone II of the housing. At least one of the annular members 8a, 8b is formed with a crenellated edge turned toward the other member, the crenellations defining curve recesses.

The radially outflowing water/gas mixture segregates in the second zone with the gas flowing to a second central opening 7b in the intermediate bottom 4b. The liquid, however, collects in an annular chamber defined by the upwardly concave bottom 4b, and upright cylindrical pipe or weir 15, and the wall of housing 1. The liquid may be drained off by a duct 16 extending laterally through the housing wall. The discharge liquid, of course, contains solid particles and may be a sludge or slurry.

Here, as in the first stage, an annular member 8c in the central opening 7b of the intermediate bottom 4b is confronted by an annular member 8d constituting an adjusting ring similar to a carriage wheel and vertically shiftable by a rod 18 within the upwardly open tub 17.

At least one of the annular members 8c and 8d is provided with curved recesses along its edge facing in the direction of the other member, i.e. is crenellated as described. In the embodiment of FIG. 1, it is the upper member which is crenellated.

The annular members 8c and 8d define an annular lateral outlet gap 14b through which the gas/liquid mixture is deflected radially. The hub 19 is secured to the sides of the tub 17 and the rod 18 extends axially through hub 19a while a bellows seal connects the upper end of the rod to the hub 19a and prevent leakage of liquid along this rod.

A downwardly concave, upwardly convex hood is secured to the tub 17 and is formed with a cylindrical apron 20 coaxially paralleling the wall of housing 1 and defining a narrow annular space 21 containing baffles 22 for the separation of drops from the gas stream which flows around this hood 20 into the lower zone III. The baffles and housing wall act as an impingement or inertial separator to cause the separated liquid to flow as a film along the housing wall for collection in sump 23 while the gases pass centrally into the outlet duct 3. The sludge or slurry is settled to recover water which is recirculated to the scrubber.

Figure 2:
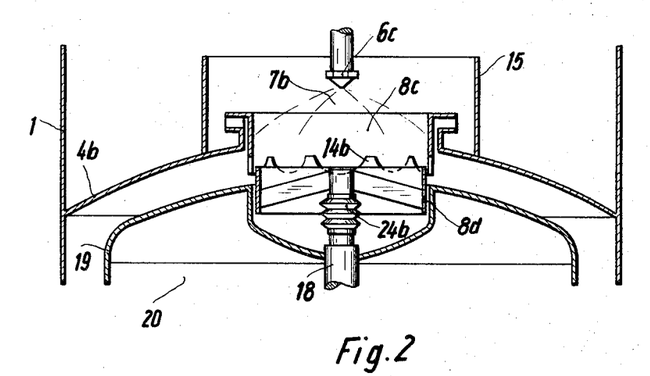
FIG. 2 is a vertical section of a single-stage scrubber or a single stage of a multistage scrubber embodying the present principles.
Figure 2A:
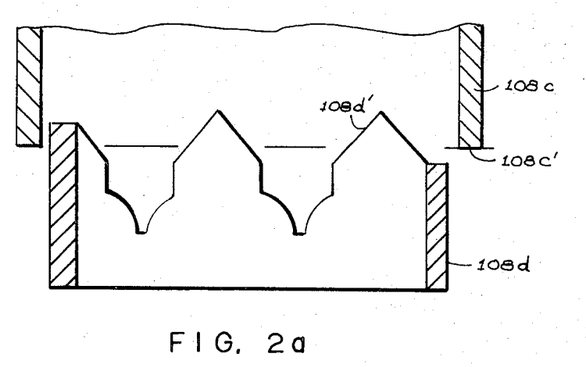
FIG. 2a is a vertical section diagrammatically illustrating a modification of FIG. 1 or FIG. 2.
Figure 2B:
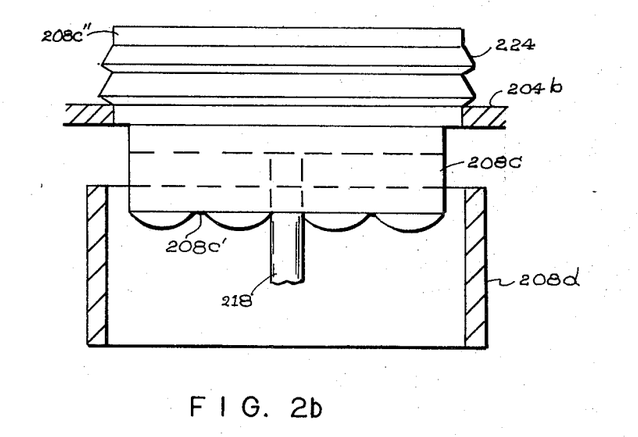
FIG. 2b is a fragmentary sectional view partly in elevation, illustrating another modification.

In FIG. 2a we show a system in which the lower member 108d is formed with the crenellated edge 108d' while the cooperating member 108c has a smooth edge 108c'. FIG. 2b shows a modification in which the upper annular member 208c is vertically shiftable on the rod 218 and has a smooth lower edge 208c' while a bellows seal 224 connects the upper flange 208c" of this annular member to the adjoining portion Of the bottom 204b. In this embodiment, the upper edge of fixed member 208d is crenellated.

Figure 2C:
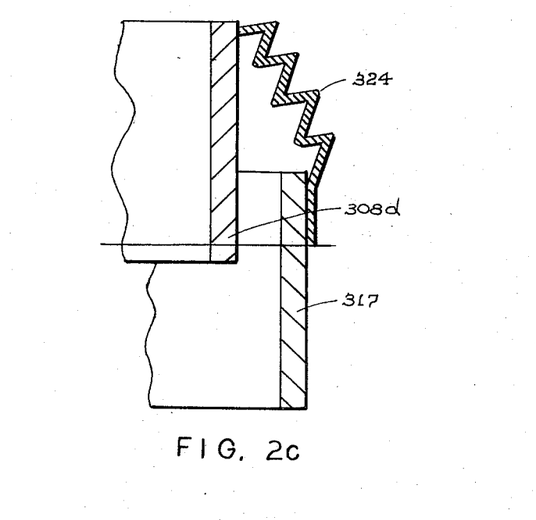
FIG. 2c is a fragmentary section showing a seal arrangement between an adjusting ring and a tub according to the invention.

FIG. 2c illustrates a further bellows seal 324 between the vertically movable lower annular member 308d and the tub 317.

It is sometimes desirable to leave a gap between the annular member 8c and the central opening 7b in the intermediate bottom 4b and also between the tub 17 and the annular member 8d which is similar to a carriage wheel. Through these gaps, liquid from the tub 17 or from the nozzle 6c enters the gas stream outside the outlet gap 14a or 14b. An additional scrubbing behind the outlet gap is accomplished and prevents a deposition of crusts and cake behind the outlet gap.

Where an incrustation need not be feared, these gaps may be sealed, e.g. by the provision of movable seals in the tub. These seals may be similar to the sealing cup 24a or the compensator 24b for the rods 13 and 18, respectively.

FIG. 2 shows by way of example also the annular members and the outlet gap in a single-stage unit. The same reference characters have been employed as in FIG. 1. The curved recesses are stationary in this case although they might alternatively be provided in the annular member which can be raised and lowered. It will make no difference whether it is the annular member 8c or 8d which is movable. In case of an automatic control of very small gas rates, the two annular members 8c and 8d move one into the other and leave open only small areas adjacent to the annular member having curved recesses.

Figure 3A:
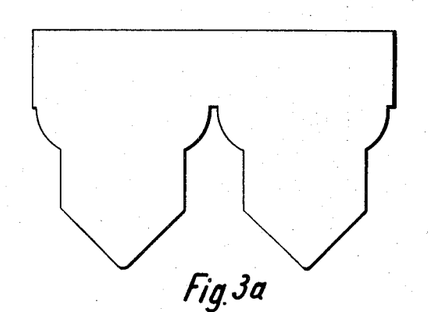
FIGS. 3a and 3b are diagrams illustrating the configurations of the crenellated edge of a ring member.
Figure 3B:
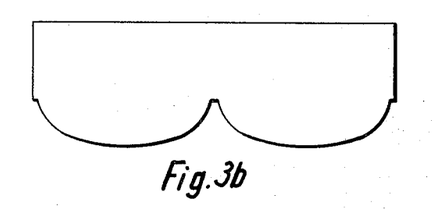

FIGS. 3a and 3b show possible configuration of the crenellation recesses providing for an approximately linear automatic control characteristic.

Figure 4:
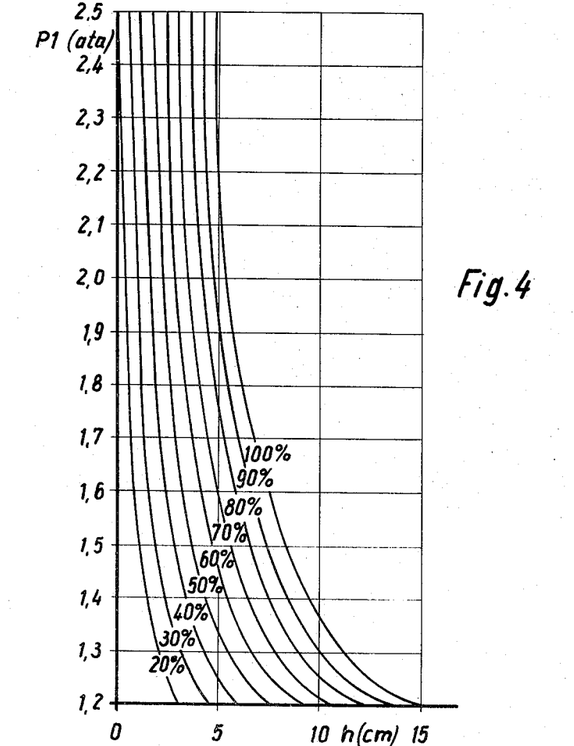
FIG. 4 is a graph of the pressure (plotted along the ordinate) vs. the elevation of the vertically shiftable member or the gap width (plotted along the abscissa) for a system in which a noncrenellated edge configuration is used.

In the chart shown in FIG. 4, the pressure $P_1$ before the outlet gap is plotted against the elevation. The parameter associated with each curve is the gas rate related to the maximum gas rate, which has been taken as 100 percent. These curves are applicable to a straight outlet gap having no cam recesses. The change of the gap width depends on the gas rate, the pressure $P_1$ before the gap and the differential pressure across the gap. For a given value of $P_1$, the change of the gap which is associated with a certain differential pressure can be taken from the curve.

The curves are hyperbolic and are very steep in the region of high pressures and flatter for lower pressures. It is apparent from the curves that particularly under high pressures and at a low gas rate a differential pressure requires only a small change of the gap, which change is in part of the same order as the tolerance of the vertical movement.

For this reason an automatic control is virtually impossible in the region in which the curve shown in FIG. 4 is very steep.

Figure 5:
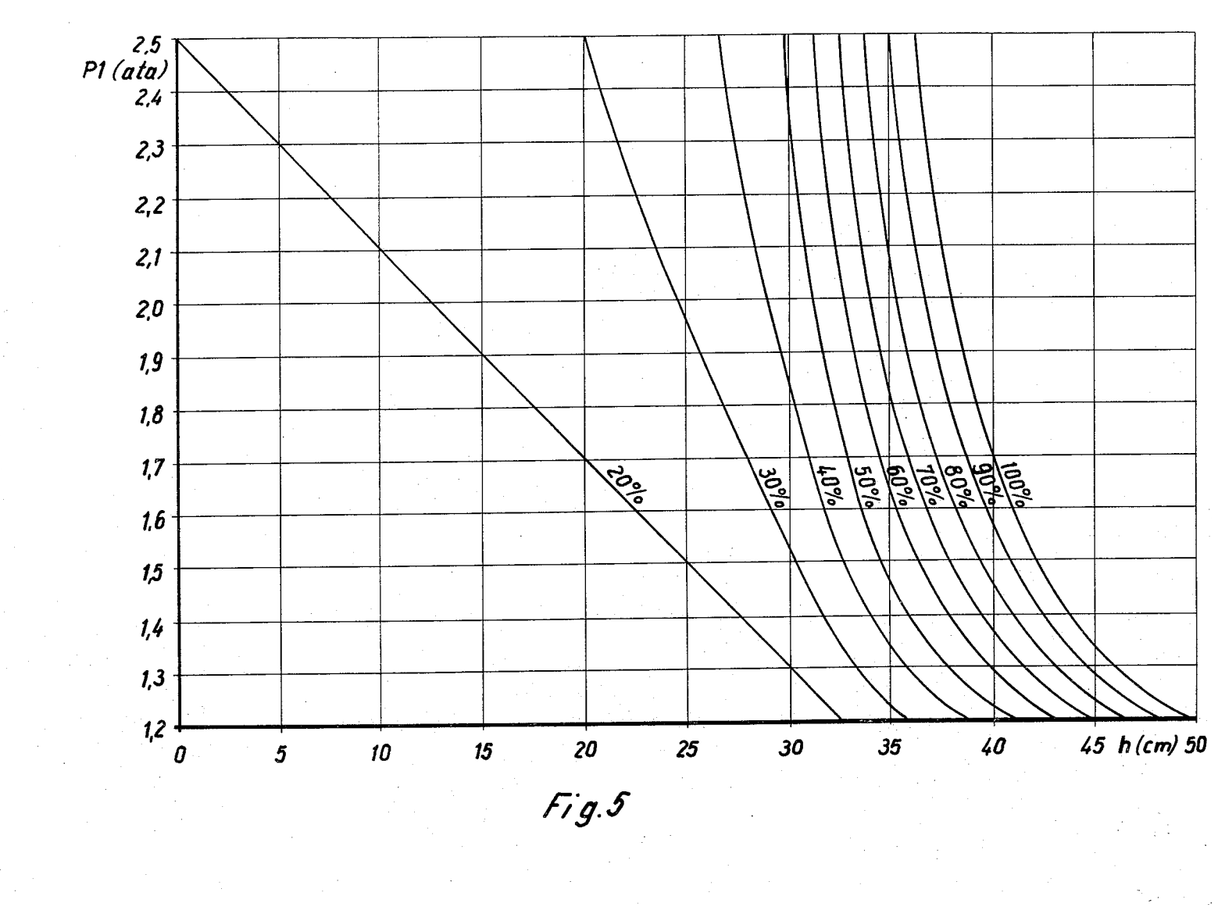
FIG. 5 is a similar graph showing the results obtained using crenellated members according to the present invention.

On the other hand, the use of annular members having curved recesses, such as are shown, e.g. in FIG. 3b, enables an automatic control also in this region, as is apparent from the associated automatic control characteristic in FIG. 5.

It is apparent that under all pressures the differential pressure has a linear or approximately linear relation to the elevation and the elevation corresponding to a differential pressure is much larger under comparable conditions than in FIG. 4.

In accordance with the practical requirements as to the operation, the invention thus enables the use of the most desirable relation for the automatic control, in most cases an approximately linear relation between elevation and pressure.

The scrubber may be used to special advantage, for instance, in the purification of the top gas from high-pressure blast furnaces, if the scrubber serves to maintain a constant, preselected pressure at the furnace top in spite of changes of the gas rate and also to cool and scrub the gas and to collect dust therefrom behind the furnace top. In this case, the scrubber serves as a pressure regulator between the furnace top and the gas pipe system.

We claim:

1. An apparatus for the scrubbing of a gas with a liquid, comprising an upright housing formed with an inlet at an upper portion and an outlet at a lower portion; a partition in said housing subdividing same between said portions into a pair of chambers, said partition being formed with a generally central opening traversable by gas and interconnecting said chambers; a tub fixed in said housing below said opening, said tub being aligned with and concave toward said opening but spaced axially from said partition; a first annular member disposed in said opening and a movable second annular member received in said tub, said annular members defining a lateral gap traversable by a liquid/gas mixture; means connected to said second member for relatively displacing said members to vary said gap; and spray means above said opening for directing liquid toward said opening.

2. The apparatus defined in claim 1 wherein at least one of said members is formed with a crenellated edge turned toward the other of said members imparting to said gap an approximately linear characteristic between the pressure drop across said gap and the relative axial positions of said members.

3. The apparatus defined in claim 1 wherein said second member is formed wtih a felly coaxial with said tub, a hub within said felly and spokes connecting said felly with said hub, said means for relatively displacing said members including a rod engaging said hub.

4. The apparatus defined in claim 1, further comprising an upstanding duct fixed to said partition and surrounding said opening for defining an annular liquid-collection chamber around said duct.

5. The apparatus defined in claim 1, further comprising a hood connected to the rim of said tub and convex in the direction of said partition, said hood reaching outwardly away from said partition toward the housing wall and defining an annular space therewith.

6. The apparatus defined in claim 5, further comprising droplet-separation baffles angularly spaced apart in said annular space.

7. The apparatus defined in claim 1 wherein said partition is generally horizontal and is upwardly concave, said apparatus further comprising a downwardly directed nozzle axially aligned with and spaced away from said opening for directing a conical spray of liquid therethrough; an upstanding duct coaxial with said opening and surrounding same above said partition and anchored thereto for defining a liquid collection chamber around said duct; an upwardly convex apron below said partition anchored to said rim of said tub and extending inwardly toward the wall of said housing; and a liquid-collection sump below said hood in said housing.

8. The apparatus defined in claim 7 wherein one of said members is crenellated along its edge facing the other of said members to maintain the pressure drop across said gap substantially in a linear function with the gap spacing.

9. The apparatus defined in claim 8, further comprising baffles angularly spaced about said hood and received in said annular space for separating droplets of liquid from the gas traversing said annular space.

* * * * *